May 16, 1961
J. M. COOK ET AL
2,984,161
MANUFACTURE OF CARTON BLANKS
Filed July 7, 1953
3 Sheets-Sheet 1
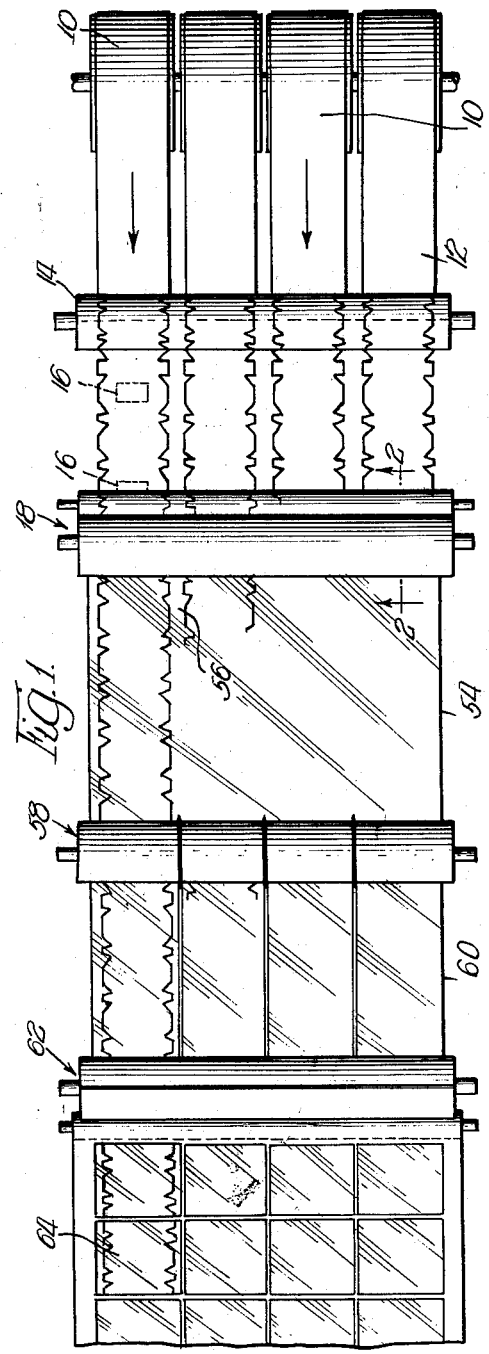
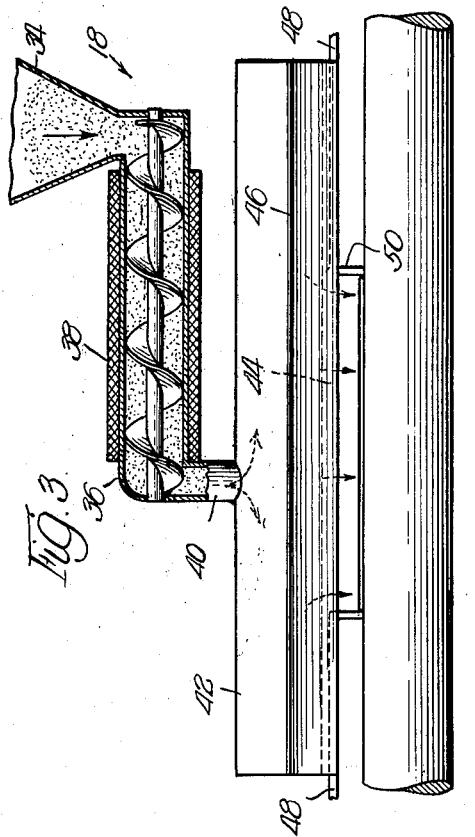
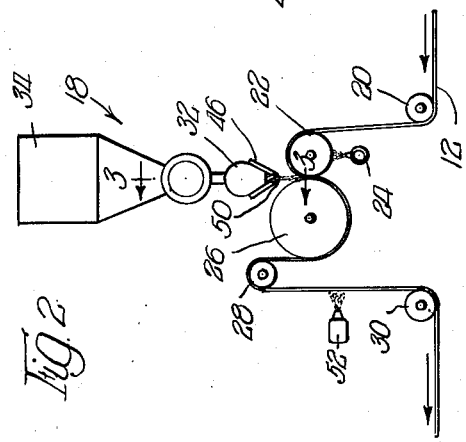
Inventors:
John M. Cook
James W. Charbonnier,
BY LeRoy Staunton,
Wilkinson Huxley Byron & Hume
Attys.

May 16, 1961  J. M. COOK ET AL  2,984,161
MANUFACTURE OF CARTON BLANKS
Filed July 7, 1953  3 Sheets-Sheet 2
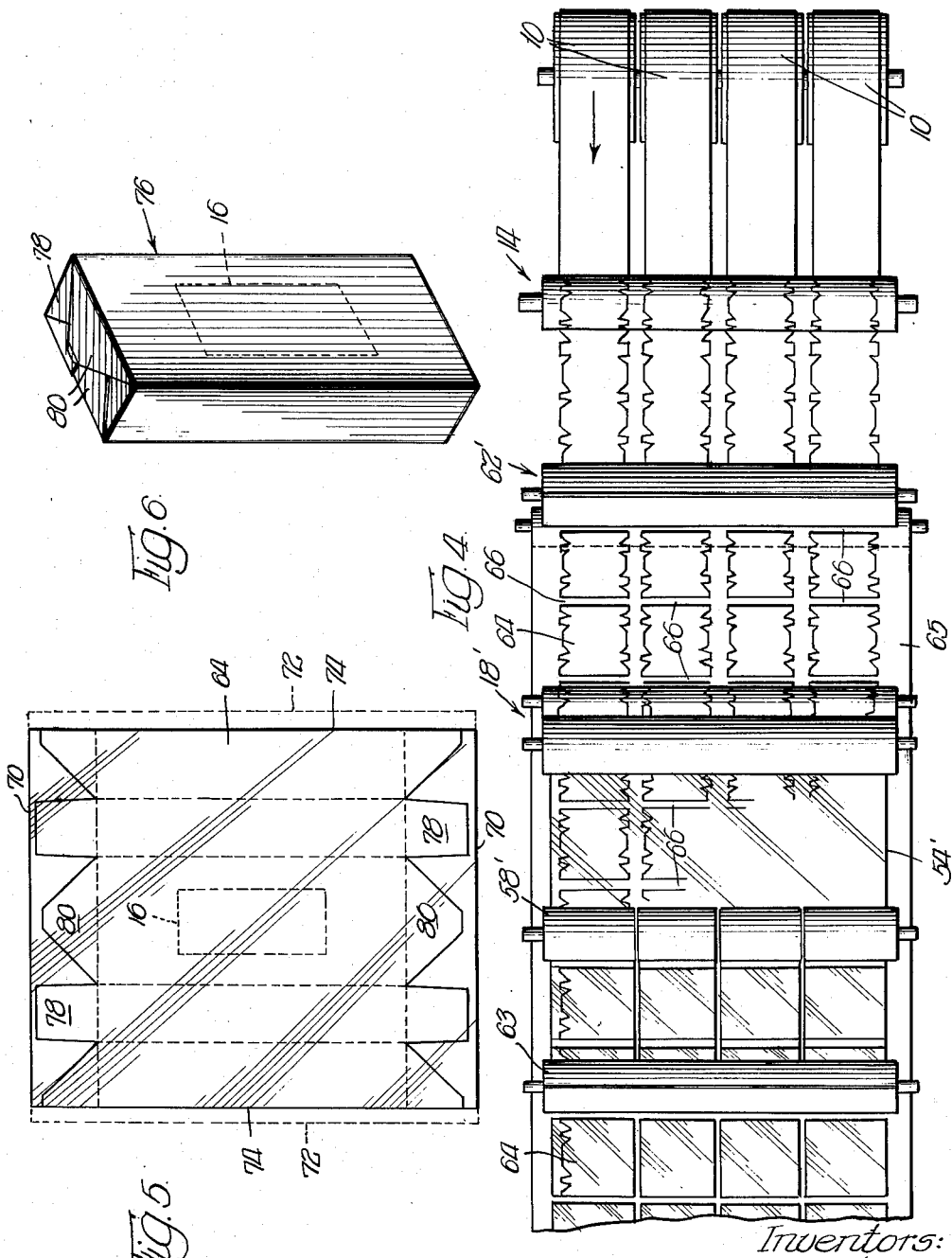
Inventors:
John M Cook
James W. Charbonnier,
BY LeRoy Staunton
Wilkinson Huxley Byron & Hume
Attys.

May 16, 1961 J. M. COOK ET AL 2,984,161
MANUFACTURE OF CARTON BLANKS
Filed July 7, 1953 3 Sheets-Sheet 3
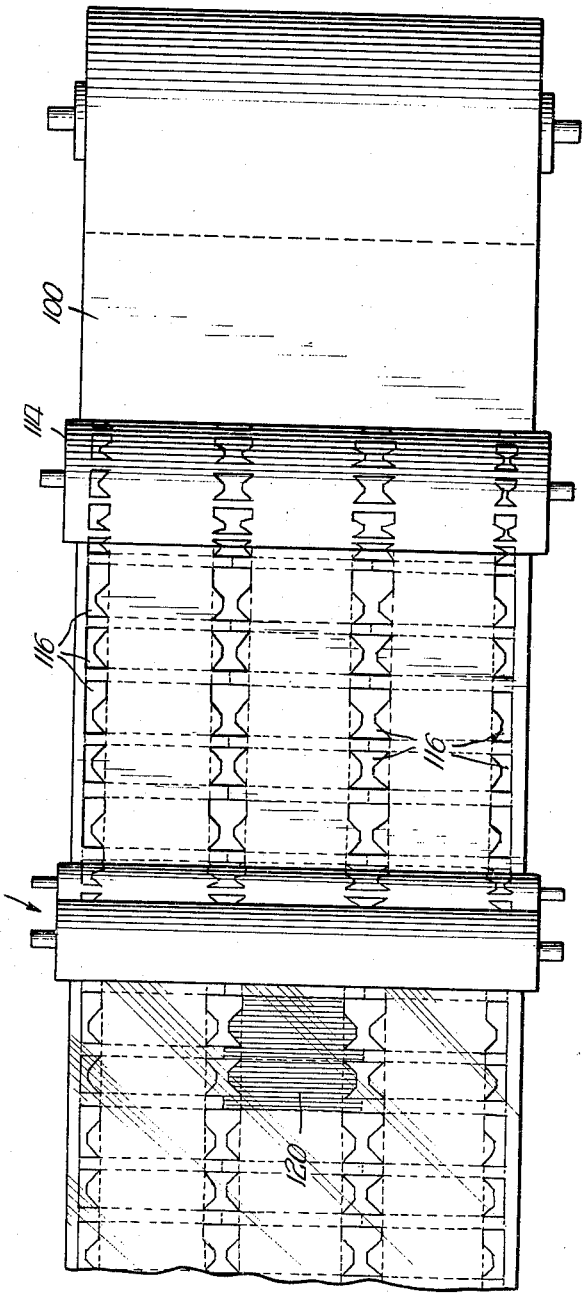
*Inventors:*
John M. Cook,
James W. Charbonnier,
BY Le Roy Staunton,
Wilkinson Huxley Byron & Hume
*Attys.*

U̇nited States Patent Office 2,984,161
Patented May 16, 1961

2,984,161

MANUFACTURE OF CARTON BLANKS

John M. Cook, James W. Charbonnier, and Le Roy Staunton, Chicago, Ill., assignors to United Wallpaper, Inc., Chicago, Ill., a corporation of Delaware Filed July 7, 1953, Ser. No. 366,416

2 Claims. (Cl. 93—36)

This invention relates to the manufacture of carton blanks which are adapted to be folded and sealed to form containers impervious to liquids, vapor, powder, and the like, and, more especially, it is aimed at the production of carton blanks for the manufacture of cartons similar to those shown in our copending application Serial No. 337,534, filed February 18, 1953, entitled, Carton Construction, now abandoned.

It has been found that certain types of plastics, such as polyethylene, that are capable of being liquefied by heat, can be applied to webs of cellulose material in liquid condition and cured in contact therewith to form a composite web in which the plastic is integrated with the cellulose material in the form of a flexible membrane to form an impervious surface thereon.

It has been discovered that the web of cellulose material prior to the coating operation may be cut along its marginal edges in the definition of flaps, which form the ends of cartons, as well as be perforated internally of the web for similar purposes and for the provision of viewing and indexing apertures therein, and that the plastic material when applied not only will bond to the cellulose blank but will bridge over such cuts and apertures therein to form a continuous membrane in association therewith without sticking to the underlying rolls. Where plastics similar to polyethylene are used, such membranes may be made transparent to provide vision through the viewing apertures in blanks provided therewith after the latter are folded into cartons. Furthermore, as has been brought out in our copending application, the continuous plastic membrane in association with the flap cut-outs extends across the latter to provide inward folds which overlap and are sealed in this relationship to provide leak-proof corners and joints in the finished carton.

Where protection against the ingress or egress of gases and light is required, the cellulose blank, either before or after the application of the plastic membrane, may be laminated with cellophane and/or metal foil, such as aluminum foil, in which case the former renders it impervious to gases, and the latter acts as a filter against harmful rays. Pigmented or dyed cellophane or polyethylene may be employed as a light filter in lieu of the foil, but preferably the cellulose material itself is dyed or printed with the light-filtering color before applying the plastic membrane.

It is accordingly an object of the present invention to teach novel methods for the mass production of cartons of this type which are simple in technique, requiring only a minimum amount of apparatus and labor in their performance, and which are semi-automatic in operation.

For an understanding of the invention, reference will now be made to the attached drawings, in which—

Figure 1 is a schematic plan view of a carton blank production line which embodies one form of the present invention;

Figure 2 is a schematic side elevational view of a portion of the apparatus shown in Figure 1, taken along line 2—2 of that figure;

Figure 3 is an enlarged schematic view of the apparatus as shown in Figure 2, showing a portion of the apparatus involved therein, and shown partly sectional as viewed along the line 3—3 of Figure 2;

Figure 4 is a schematic plan view of a modified form of apparatus corresponding to Figure 1;

Figure 5 shows an individual carton blank made in accordance with the present invention;

Figure 6 represents a carton which has been folded and sealed from a blank similar to that shown in Figure 5;

Figure 7 is a schematic plan view of another system for producing a plurality of carton blanks in accordance with the present invention from a single web of cellulose material; and Figure 8 is a carton blank resulting from the system of Figure 7.

Referring more particularly to the drawings, one or more rolls 10 of cellulose material, such as cardboard or heavy paper stock, are designed to deliver webs 12 continuously to a roller die 14, which scores the webs for folding and cuts the marginal edges of the webs in a recurrent pattern definitive of flaps that are ultimately folded to comprise the ends of the carton. Central apertures, similar to those shown in dotted lines 16, may also be struck from the web by the roller dies 14.

The webs are then continuously advanced through a plastic coating machine 18 which is shown in side elevation in Figure 2, and a part of which is schematically illustrated in Figure 3. Referring first to Figure 2, it will be seen that the webs 12 are advanced beneath a guide roll 20 and up over a rubber surfaced back-up roll 22 which is kept moist and cool by means of a water spray 24 delivered against the bottom thereof. The rubber roll 22 turns on a horizontal axis which is common to the horizontal plane within which lies the axis of a chromium-plated water-chilled roll 26, against which it bears. The webs pass downwardly between rolls 22 and 26 and are withdrawn over guide rollers 28 and 30.

Arranged above the nip of the rolls 22 and 26 there is a device 32 which is designed to deliver a thin liquid film of plastic material into the nip of the rolls upon the cellulose webs 12, which film is slightly wider than the collective width of the several webs passing therethrough. When the plastic material is a thermoplastic or thermosetting resin, such as polyethylene, solid plastic powder may be disposed in a hopper 34 and delivered into a translating screw chamber 36, which chamber is heated by surrounding heating elements 38 to soften the plastic into a liquid condition. The liquid plastic is displaced through the connection 40 into the spreading head 42, which has an adjustable pouring slot 44 along its bottom edge through which the volume and width of the stream delivered therethrough are controlled by adjustable knife edges 46 and by axially adjustable closure bars 48.

The stream of liquid plastic 50 is delivered into the nip of the rolls 22, 26, where the chilling action forms a flexible plastic membrane of a width exceeding the web or webs 12 by a quarter to a half inch, more or less, and of a thickness determined by (1) the clearance between the knife edges 46, (2) the clearance between the rolls 22, 26, and (3) the speed of advance of the web, or webs, as determined by the angular velocity of the latter.

As one example of a desired coating practice, the setting of the knife edges may have .02 of an inch clearance between them with a roll setting affording a clearance of .0005 to .001 of an inch, which is substantially the thickness of the cellulose material passing therebetween. The rate of advancement of the web or webs, and hence the turning of the rolls 22, 26, is such as to receive the plastic delivered by this orifice setting without flooding, This may be determined empirically for any given width of plastic membrane and the number of webs being run.

As the composite web emerges from the coating rolls and passes between the guide rolls 28 and 30 on the exit side, it is preferably passed in proximity to a gas flame wipe 52, which, in the case of polyethylene membranes, is effective to remove a cloudy or milky appearance characteristic of this type of plastic when formed in this manner. The webs are thus integrated in the plastic coating machine 18, as appears at 54 in Figure 1, so that each of the webs is included within a continuous membrane of plastic which extends from or beyond the outermost marginal portions of the cut edges of the webs and bridges across the latter, as well as across any intermediate apertures, such as 16, previously mentioned, and connects the webs between their adjacent edges, as appears at 56 in Figure 1.

The plastic will be found to have become impregnated in and bonded with the cellulose material so as to form an integral sheet therewith, as distinguished from being laminated in plies. The composite web is then passed continuously to a rotary knife and trimmer mechanism 58, which trims the marginal edge of the plastic membrane and slits the plastic membrane between the contiguous webs, as appears at 60 in Figure 1. The separate composite webs then proceed to a transverse cutter 62 which divides them into the carton blanks 64, which are then collected and are ready to be folded for use.

In Figure 4 there is a modified form of production line, which in its essential parts is the same as that of Figure 1, except that the webs after being scored for folding and cut for purposes of flap definition along their marginal edges by means of the initial cutter 14, are, before being introduced to the plastic coating machine 18', passed through a transverse cutter 62', which divides the webs into individual blanks 64' prior to the coating. The blanks 64' are delivered from the cutter 62 onto a moving belt 65, the rate of advance of which is slightly in excess of the rate at which the blanks are delivered from the cutter 62', which is effective in separating the blanks one from another in directions axially of each of the webs, as is indicated by the spaces 66 in Figure 4.

The severed blanks are then delivered into the coating machine 18', which has been modified to permit the blanks to be received into the nip of the coating rolls through suitable guides and hold-downs (not shown) provided for this purpose. The blanks, as they emerge from the coating machine 18', are connected together by the plastic membrane 54' from margin to margin of the latter, and longitudinally between the adjacent courses of blanks, as well as transversely across the spacing 66 previously referred to. The membrane between the blanks is then severed longitudinally by a slitter 58' and is cut transversely by a second transverse cutter 63.

The purpose of this modification is to insure that the coated blanks are not only afforded with a marginal excess of plastic membrane at the flap edges thereof, as is indicated at 70 in Figure 5, but are afforded a corresponding marginal excess of membrane on the remaining edges as indicated in the broken lines at 72 in that figure. The carton resulting from the production line of Figure 1 has the marginal excess of membrane 70, but the plastic and cellulose material are necessarily coterminous along the transverse cuts 74, as appears in Figure 5.

The carton 76, Figure 6, made from the blank 64 of Figure 5, is representative of the type of carton covered in our copending application previously hereinbefore referred to. The webs may be provided, in advance of treatment by the systems herein disclosed, with a cellophane and/or aluminum foil backing attached to the surface of the cellulose material opposite to that to which the plastic is applied, or plies of cellophane and/or aluminum foil may be simultaneously payed from supply reels (not shown) into engagement with the webs and suitably glued or adhered thereto at any stage of processing prior to the shaping and cutting of the blanks. In this respect, the polyethylene makes for a simple and convenient thermosealing substance, which, once the carton is closed and sealed, is liquid-tight and impervious to vapor and dust. The cellophane, on the other hand, provides resistance to the penetration of gases, not possessed by the polyethylene alone, and the aluminum foil affords a thermal and optical barrier by which harmful rays may be excluded in the absence of suitable pigment or dye incorporated either in the cellulose material, the cellophane, or the polyethylene materials for the same purpose.

As is pointed out in our copending application, blanks made in this manner provide cartons that are formed with one longitudinal seam per carton, where the edges 72, 74 are overlapped and sealed, and with two transverse seams, where the polyethylene is overlapped by bending the lesser flaps 78 inwardly toward each other, and the larger flaps 80 (which are more pointed) outwardly into the plane common to the upper side edges of the carton within which the lesser flaps are disposed when in closed position. This draws the marginal excess 70 of the polyethylene membrane into overlapping or upstanding abutment in a straight line crosswise of the ends of the carton, which is thus conveniently engaged and sealed in a straight line in one operation to make a liquid- and sift-proof joint. The larger flaps 80 are then folded inwardly and are either glued or sealed by heat pressure, all as is more fully set forth and described in our application mentioned hereinbefore.

The modification of the invention as shown in Figures 7 and 8 contemplates the use of a single breadth of cellulose material comprising a relatively continuous web 100, which is passed through the scoring and cutting dies 114, wherein openings 116 are blanked into the body of the web between the margins thereof. In effect, this makes a plurality of window-like openings entirely within the body of the web, which define flaps in the same manner as the margin cuts previously referred to in the preceding embodiments. In this respect, it has been found desirable to minimize the vacant spaces which the polyethylene must bridge, and it makes for a better coating operation when the openings are completely framed by the cellulose material.

The perforated web is then advanced through the coating machine, similar to that shown in Figures 1 and 2, whereby it is coated with the thermosetting plastic from the outer edges of the web entirely across its width, including the cut-out portions.

There is shown in Figure 1 a shaded area 120, which represents one blank of the several formed in the web, which, after it is removed therefrom, appears as is shown in Figure 8. In this form of the invention the carton blank has no excess polyethylene margins on any of its edges. The blank is folded, as has otherwise been described in connection with Figures 5 and 6, to form the completed carton. It is possible for the scoring and cutting dies 114 to cut around the margins of each of the blanks so as nearly to free the latter from the web, while at the same time leaving sufficient contact between them to permit them to be advanced in web form through the coating machine. The plastic coating will bind them together again, but inasmuch as it becomes firmly bonded to the cellulose material, it has been found that where polyethylene constitutes the coating membrane, it will tear readily between contiguous edges of cellulose material when the latter are moved in shear. Apparently, this is due to the fact that the polyethylene at the points where it is reinforced by the cellulose material forms a stronger bond and section therewith than its own inherent strength possesses. Hence it tears evenly along the precut margins, so that it is only necessary for the carton blanks to be pulled from the composite web after the coating operation, to be ready for folding into cartons.

We claim:
1. In the art of making blanks for folded cartons, the improvement which includes forming a plurality of lengths of several webs of cellulose material, joining all of said webs together in a membrane of polyethylene by passing said webs downwardly between a pair of horizontal chilling and compression rollers, to the entrance of which is supplied a flow of liquid polyethylene, separating said webs by slitting the membrane intermediately thereof and cutting the membranous webs transversely into carton blanks.

2. In the art of making blanks for folded cartons, the improvement which includes forming a plurality of blanks of cellulose material, spacing said blanks from each other longitudinally and transversely, joining all of said blanks together in a membrane of polyethylene by passing them downwardly between a pair of horizontal chilling and compression rollers to the entrance of which is supplied a flow of liquid polyethylene, and separating the blanks by slitting the membrane intermediately thereof to provide individual carton blanks each having a projecting margin of polyethylene extending beyond the edges of the cellulose material completely surrounding the blank.

References Cited in the file of this patent

UNITED STATES PATENTS

| Number | Name | Date |
|---|---|---|
| 864,731 | Hahn | Aug. 27, 1907 |
| 1,595,431 | Veitinger | Aug. 10, 1926 |
| 2,100,522 | Russell et al. | Nov. 30, 1937 |
| 2,116,828 | Gearson | May 10, 1938 |
| 2,284,604 | Brooks | May 26, 1942 |
| 2,382,573 | Moore | Aug. 14, 1945 |
| 2,405,977 | Peters | Aug. 20, 1946 |
| 2,431,042 | Ingersoll | Nov. 18, 1947 |
| 2,432,053 | Waters | Dec. 2, 1947 |
| 2,462,331 | Myers | Feb. 22, 1949 |
| 2,565,944 | Bergstein | Aug. 28, 1951 |
| 2,632,921 | Kreidl | Mar. 31, 1953 |